United States Patent
Dai

(10) Patent No.: US 8,094,805 B2
(45) Date of Patent: Jan. 10, 2012

(54) COMMUNICATION TERMINAL AND COMMUNICATION METHOD THEREOF

(75) Inventor: Lung Dai, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 144 days.

(21) Appl. No.: 12/768,555

(22) Filed: Apr. 27, 2010

(65) Prior Publication Data

US 2011/0044443 A1 Feb. 24, 2011

(30) Foreign Application Priority Data

Aug. 21, 2009 (CN) .......................... 2009 1 0305902

(51) Int. Cl.
*H04M 1/00* (2006.01)
(52) U.S. Cl. .................. 379/355.05; 455/466; 455/415; 379/142.04
(58) Field of Classification Search .................. 455/466, 455/415; 379/142.04, 142.01, 221.14, 355.01, 379/355.02, 355.05
See application file for complete search history.

(56) References Cited

U.S. PATENT DOCUMENTS

| | | |
|---|---|---|
| 6,295,458 B1 * | 9/2001 | Takahashi ...................... 455/466 |
| 6,587,688 B1 * | 7/2003 | Chambers et al. ............. 455/433 |
| 2006/0046785 A1 * | 3/2006 | Cagney .......................... 455/565 |
| 2008/0049918 A1 * | 2/2008 | Heinze et al. ............... 379/142.1 |
| 2010/0111289 A1 * | 5/2010 | Fallen-Bailey .......... 379/355.09 |
| 2011/0116613 A1 * | 5/2011 | Hlin .......................... 379/142.06 |

* cited by examiner

*Primary Examiner* — Olisa Anwah
(74) *Attorney, Agent, or Firm* — Altis Law Group, Inc.

(57) ABSTRACT

A communication terminal includes an obtaining unit, a judging unit, a removing unit, and a transmitting unit. The obtaining unit obtains a phone number which is associated with a message from a transmitter. The judging unit determines whether an international code precedes a telephone number used by the transmitter, and further for generating a first control signal when the phone number includes an international code preceding the telephone number. The removing unit removes the international code from the phone number in response to the first control signal to get the telephone number only. The transmitting unit communicates with the transmitter using the telephone number only.

12 Claims, 3 Drawing Sheets

COMMUNICATION TERMINAL AND COMMUNICATION METHOD THEREOF

BACKGROUND

1. Technical Field

The present disclosure relates to communication terminals, and more particularly to a communication terminal and a communication method used by the communication terminal.

2. Description of Related Art

Some mobile communication networks adds the international code to the sender phone number when conveying messages from the sender to the recipient even when the sender and the recipient are within the same country. In replying to the message, a combination of the international code and the telephone number will be used.

However, if the international code is used when a reply message is sent, the sender may have to pay an additional fee even if the sending terminal is in the same country/district as the receiving terminal Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the three views.

DETAILED DESCRIPTION

Figure 1:
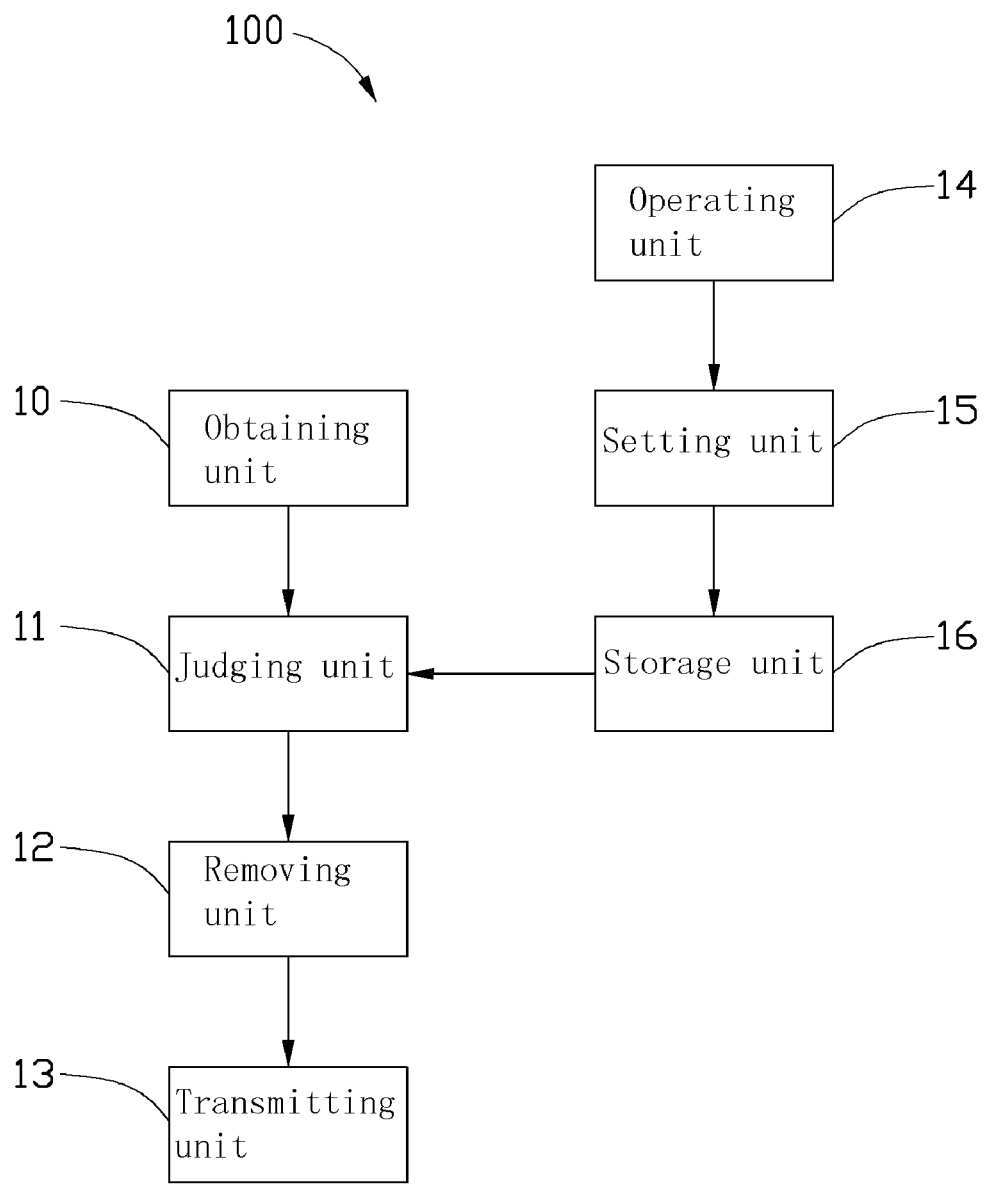
FIG. 1 is a functional block diagram of a communication terminal, in accordance with an exemplary embodiment.

Referring to FIG. 1, a communication terminal 100 according to an exemplary embodiment is illustrated. The communication terminal 100, such as a mobile phone, includes an obtaining unit 10, a judging unit 11, a removing unit 12, a transmitting unit 13, an operating unit 14, a setting unit 15, and a storage unit 16.

The obtaining unit 10 is for obtaining a phone number associated with a message from a transmitter. In this embodiment, the phone number maybe include a telephone number used by the transmitter and an international code, or the phone number maybe just include the telephone number only.

The judging unit 11 is for determining whether the phone number has an international code preceding the telephone number, and further for generating a first control signal when the phone number has the international code, and generating a second control signal when the phone number does not have the international code.

The storage unit 16 is for storing the international code. In this embodiment, the storage unit 16 stores a table of various international codes. The international codes may be set in the factory.

The removing unit 12 is for removing the international code from the phone number in response to the first control signal to get the telephone number only.

The transmitting unit 13 is for communicating with the transmitter using the telephone number, and further for communicating with the transmitter using the phone number in response to the second control signal. For example, the transmitting unit 13 replies to the message using the telephone number or calls the transmitter using the telephone number.

The operating unit 14 is for determining whether the international code should be included with the telephone number, that is, determining whether the transmitter is out of a country of the terminal 100. In this embodiment, the operating unit 14 includes a first menu item such as "yes" and a second menu item such as "no" displayed on the communication terminal 100. If the first menu item is selected, the operating unit 14 determines that the telephone number needs to include the international code, and generating a first operating signal. If the second menu item is selected, the operating unit 14 determines that international code does not need to be included with the telephone number, and generating a second operating signal.

The setting unit 15 is for setting the phone number according to the first operating signal and the second operating signal. In detail, the setting unit 15 is used for setting the phone number as a combination of the telephone number and the international code in response to the first operating signal. The setting unit 15 is also used for setting the phone number as the telephone number only in response to the second operating signal.

As discussed above, the communication terminal 100 can remove the international code from the phone number, and communicates with the transmitter using the telephone number only when the international code is not needed. Thus, the communication terminal 100 is able to communicate with the transmitter (reply to the message with a message or call the transmitter) by using the telephone number only and thus save money by not including the international code with the telephone number.

In this embodiment, the removing unit 14 and the setting unit 15 can be arranged as shortcuts displayed by the communication terminal 100.

Figure 2:
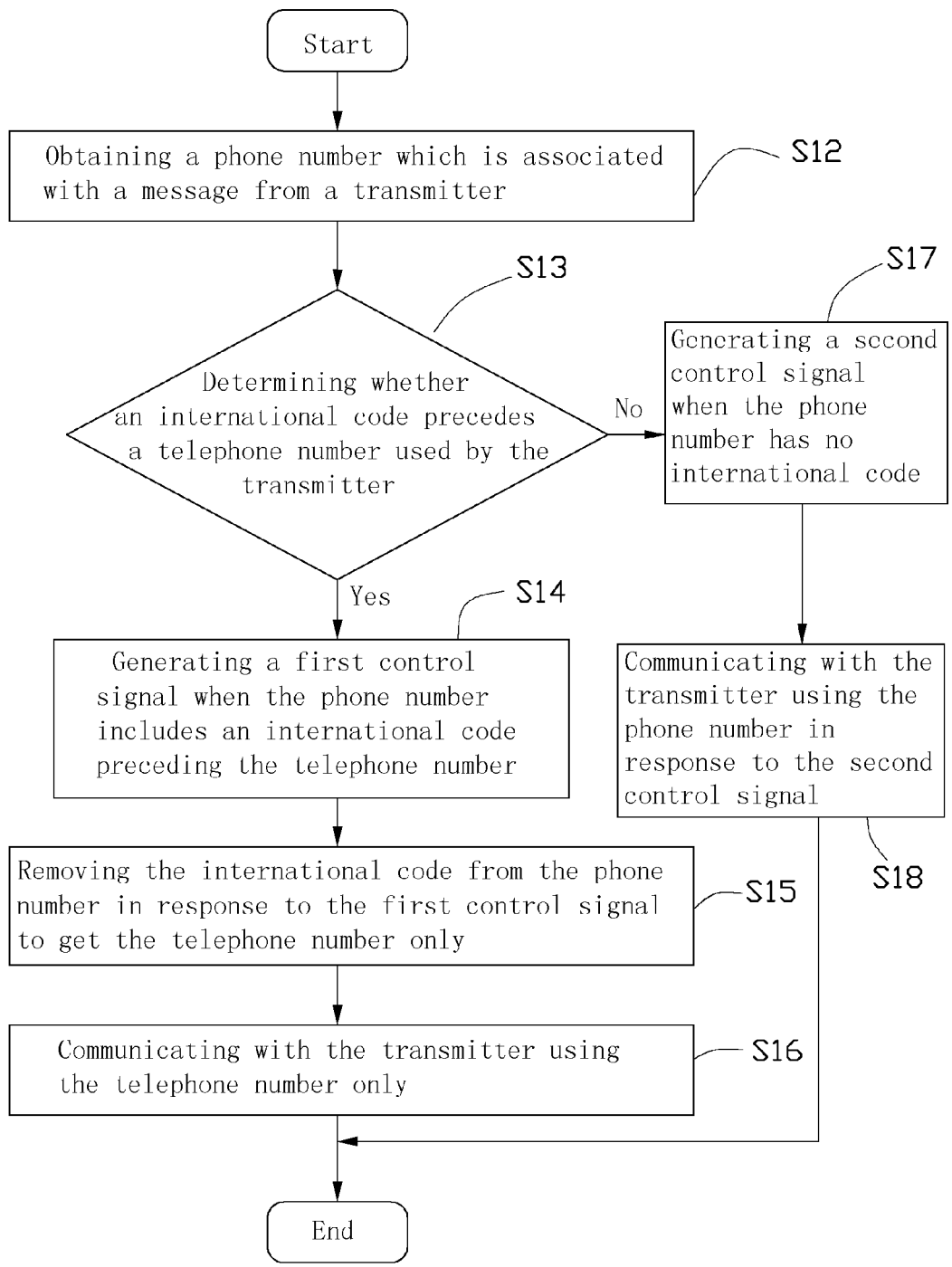
FIG. 2 is a flowchart of a communication method for replying to a message, in accordance with an exemplary embodiment.

Further referring to FIG. 2, a communication method in accordance with an exemplary embodiment capable of being implemented by the communication terminal 100. A procedure of the communication method is described in the following steps.

In step S12, obtaining a phone number which is associated with a message from a transmitter.

In step S13, determining whether an international code precedes a telephone number used by the transmitter. International codes are stored in the communication terminal 100.

In step S14, generating a first control signal when the phone number includes an international code preceding the telephone number.

In step S15, removing the international code from the phone number in response to the first control signal to get the telephone number only.

In step S16, communicating with the transmitter using the telephone number only.

In step S17, generating a second control signal when the phone number has no international code.

In step S18, communicating with the transmitter using the phone number in response to the second control signal.

Figure 3:
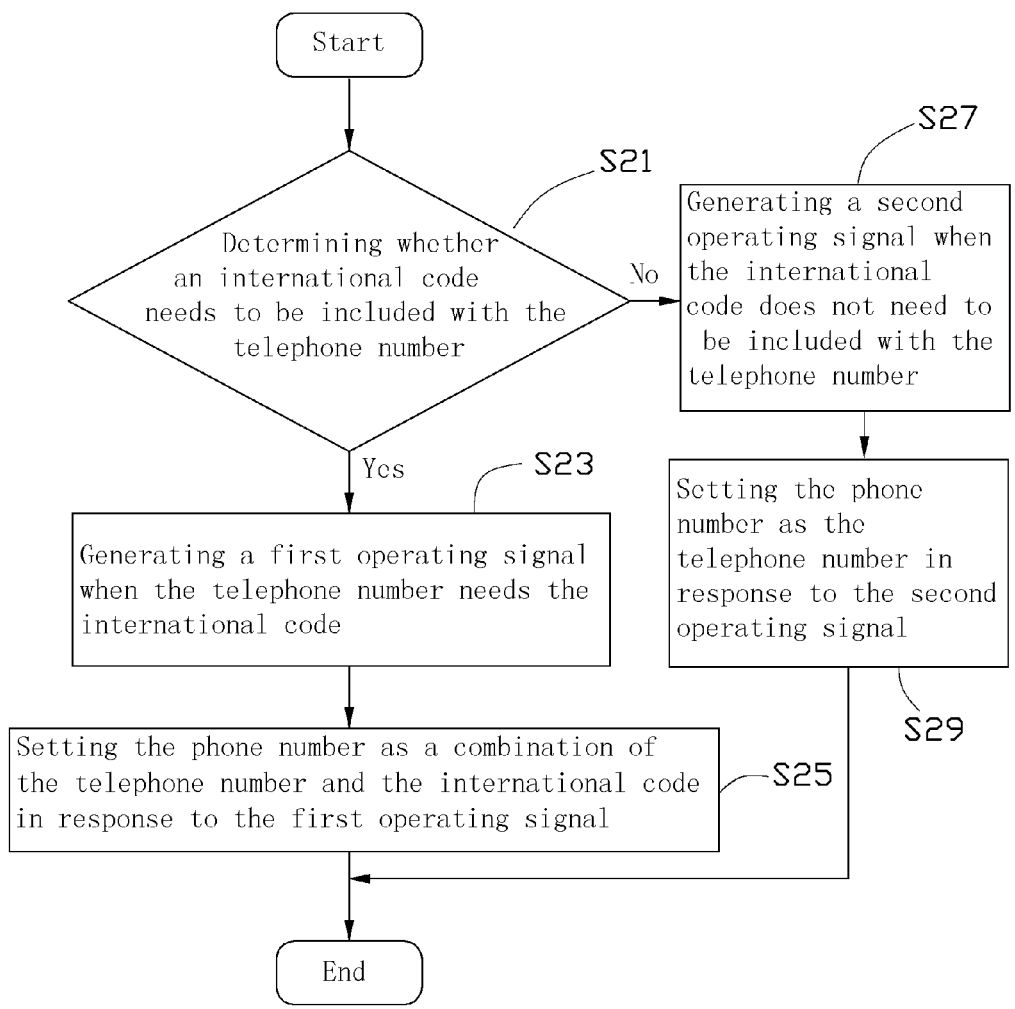
FIG. 3 is a flowchart showing steps for setting an international code of the communication method of FIG. 2.

Further referring to FIG. 3, the procedure of the communication method further includes following steps.

In step S21, determining whether an international code needs to be included with the telephone number. Whether the telephone number is needs to include the international code, that is, determining whether the transmitter is out of a country of the terminal 100.

In step S23, generating a first operating signal when the telephone number needs the international code.

In step S25, setting the phone number as a combination of the telephone number and the international code in response to the first operating signal.

In step S27, generating a second operating signal when the international code does not need to be included with the telephone number.

In step S29, setting the phone number as the telephone number in response to the second operating signal.

As discussed above, the communication terminal 100 has the function of removing the international code when it is not needed. Thus, replying to communications with the communication terminal 100 need not incur additional fees by the unnecessary inclusion of an international code with a telephone number.

It is to be understood, however, that even though numerous embodiments have been described with reference to particular embodiments, but the present disclosure is not limited to the particular embodiments described and exemplified, and the embodiments are capable of considerable variation and modification without departure from the scope of the appended claims.

What is claimed is:

1. A communication terminal, comprising:
    an obtaining unit for obtaining a phone number which is associated with a message from a transmitter;
    a judging unit for determining whether an international code precedes a telephone number used by the transmitter, the judging unit further generating a first control signal when the phone number includes an international code preceding the telephone number;
    a removing unit for removing the international code from the phone number in response to the first control signal to get the telephone number only; and
    a transmitting unit for communicating with the transmitter using the telephone number only.

2. The communication terminal of claim 1, further comprising a storage unit for storing a table of various international codes.

3. The communication terminal of claim 1, wherein the judging unit further generates a second control signal when the phone number has no international code, the transmitting unit communicates with the transmitter using the phone number in response to the second control signal.

4. The communication terminal of claim 1, further comprising:
    an operating unit for determining whether an international code needs to be included with the telephone number, the operating unit generates a first operating signal when the telephone number needs the international code; and
    a setting unit for setting the phone number as a combination of the telephone number and the international code in response to the first operating signal.

5. The communication terminal of claim 4, wherein the operating unit further generates a second operating signal when the international code does not need to be included with the telephone number , the setting unit sets the phone number as the telephone number in response to the second operating signal.

6. The communication terminal of claim 4, wherein the operating unit and the setting unit are arranged as shortcuts displayed by the communication terminal.

7. A communication method capable of being implemented by a communication terminal, the communication method comprising:
    obtaining a phone number which is associated with a message from a transmitter;
    determining whether an international code precedes a telephone number used by the transmitter;
    generating a first control signal when the phone number includes an international code preceding the telephone number;
    removing the international code from the phone number in response to the first control signal to get the telephone number only; and
    communicating with the transmitter using the telephone number only.

8. The communication method of claim 7, wherein the communication terminal stores a table of various international codes.

9. The communication method of claim 7, further comprising:
    generating a second control signal when the phone number has no international code; and
    communicating with the transmitter using the phone number in response to the second control signal.

10. The communication method of claim 7, further comprising:
    determining whether an international code needs to be included with the telephone number;
    generating a first operating signal when the telephone number needs the international code; and
    setting the phone number as a combination of the telephone number and the international code in response to the first operating signal.

11. The communication method of claim 10, further comprising:
    generating a second operating signal when the international code does not need to be included with the telephone number; and
    setting the phone number as the telephone number in response to the second operating signal.

12. The communication method of claim 7, wherein the communication method is arranged as a shortcut displayed by the communication terminal.

* * * * *